Patented Sept. 1, 1931

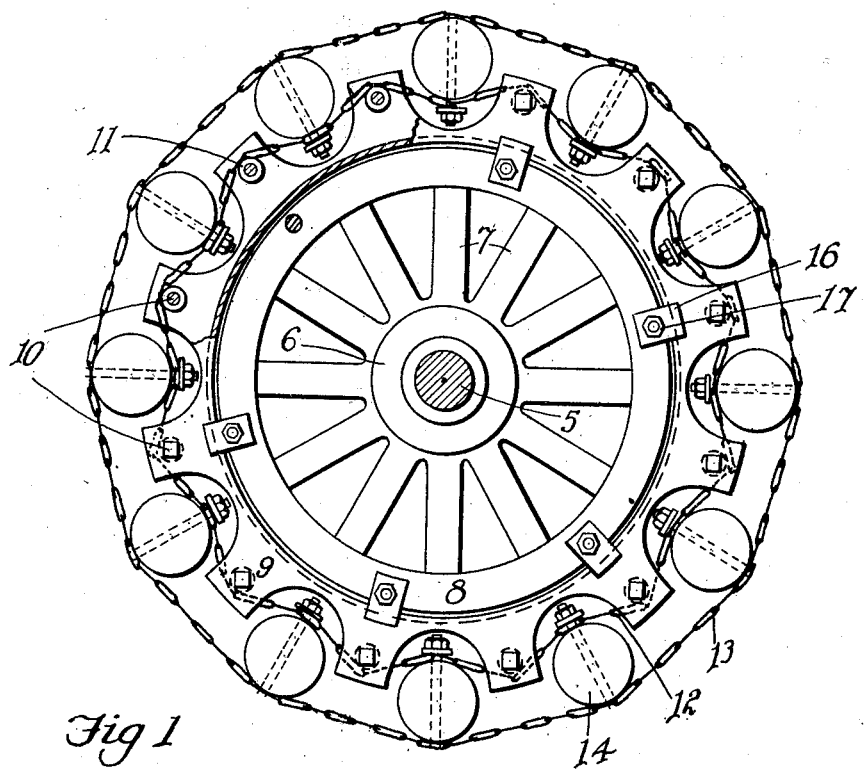
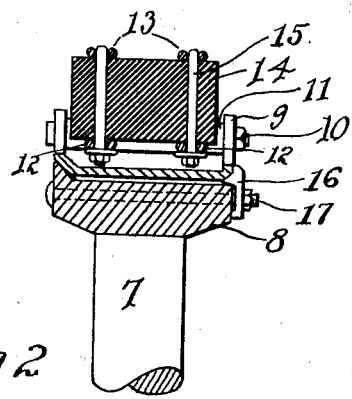

1,821,901

UNITED STATES PATENT OFFICE

HORACE J. PULLEN, OF LOS ANGELES, CALIFORNIA

VEHICLE DRIVING WHEEL

Application filed May 18, 1926. Serial No. 109,875.

My invention relates to improvements in the driving wheels of trucks, tractors, automobiles, and other vehicles having a driving wheel that travels over a surface and causes the movement of the vehicle, and the object thereof is to provide a vehicle driving wheel that will have greater power to propel the vehicle than the driving wheels now in common use.

In the drawings forming a part of this application Fig. 1 is a side elevation of a driving wheel containing my improvement, with parts broken away to show details. Fig. 2 is a sectional detail of the track, tire and felloe.

Referring to the drawings, 5 is the axle of a vehicle, 6 is the hub, 7 the spokes and 8 the felloes. In the utilization of my invention, the felloe would be of a construction best adapted for the use of the vehicle. The rim consists of a scalloped U-shaped member 9 and connected parts. Extending across the channel of member 9 are bearing bolts 10 on which are mounted sleeve 11. There are as many bolts and sleeves as there are scallops in member 9. Extending around the rim is the track which is composed of an inner flexible member shown in the drawings as two chains 12 and an outer flexible member shown in the drawings as two chains 13 and spacing members 14. There are as many spacing members as there are bolts and the spacing members are connected to the outer and inner flexible members by bolts 15 which completes the part that I term the track. The inner member of this track engages sleeves 11, but is not united thereto, and is prevented from coming off by those portions of member 9 which project beyond the sleeves. The flexible members may be of any suitable material and must be strong enough to sustain the weight thrown on them and the bearing bolts spaced apart to provide a suitable support for the track. The distance of the spacing and the strength and dimensions of the materials are dependent on the uses in which the wheel is employed. The rim may be secured upon the felloe in any suitable manner. I have shown it secured by bolts 17 and clips 16.

The flexible members are preferably nonelastic. If desired the track could be inclosed by a suitable casing not shown.

By this construction it will be seen that there will always be at least the track between two spacing members in engagement with the surface traveled over and that the flexible members prevent the spacing members from separating when the load is thrown on the inner flexible member as the bearing bolts engage the inner flexible member as the wheel is revolved. The bearing bolts operate as cogs.

I have shown member 9 scalloped so as to prevent engagement of the spacing members of the track with member 9 as the wheel is revolved, but such scalloping is not indispensable. Members 14 may be of elastic or nonelastic material. Members 9—10 and 11 constitute a cog rim.

Having described my invention, I claim:

1. In a wheel, a rim U-shaped in cross-section and having portions projecting beyond the other parts and having supporting bolts extending from side to side in said projecting portions, and a track formed of outer and inner members and spacing members connected to said outer and inner members, said inner track member being mounted on and supported by the bolts of the rim and prevented from sliding off by the outer projecting parts of said rim and adapted to slide on said bolts.

2. In a vehicle driving wheel, a rim adapted to be secured upon the felloe of the wheel, said rim comprising a member U-shaped in cross-section and bolts secured in the sides and above the bottom and below the edges of the member, and a track mounted on said bolts, said track comprising outer and inner non-elastic flexible members with spacing members secured to said outer and inner members, there being a spacing member between each pair of bolts, said inner member contacting with said bolts but not connected thereto and being prevented from coming off said bolts by the projecting portions of the rim.

In witness that I claim the foregoing I have hereunto subscribed my name this 12th day of May, 1926.

HORACE J. PULLEN.